No. 700,168. Patented May 20, 1902.
J. G. BROWN.
DEHORNING INSTRUMENT.
(Application filed Sept. 24, 1900.)
(No Model.)
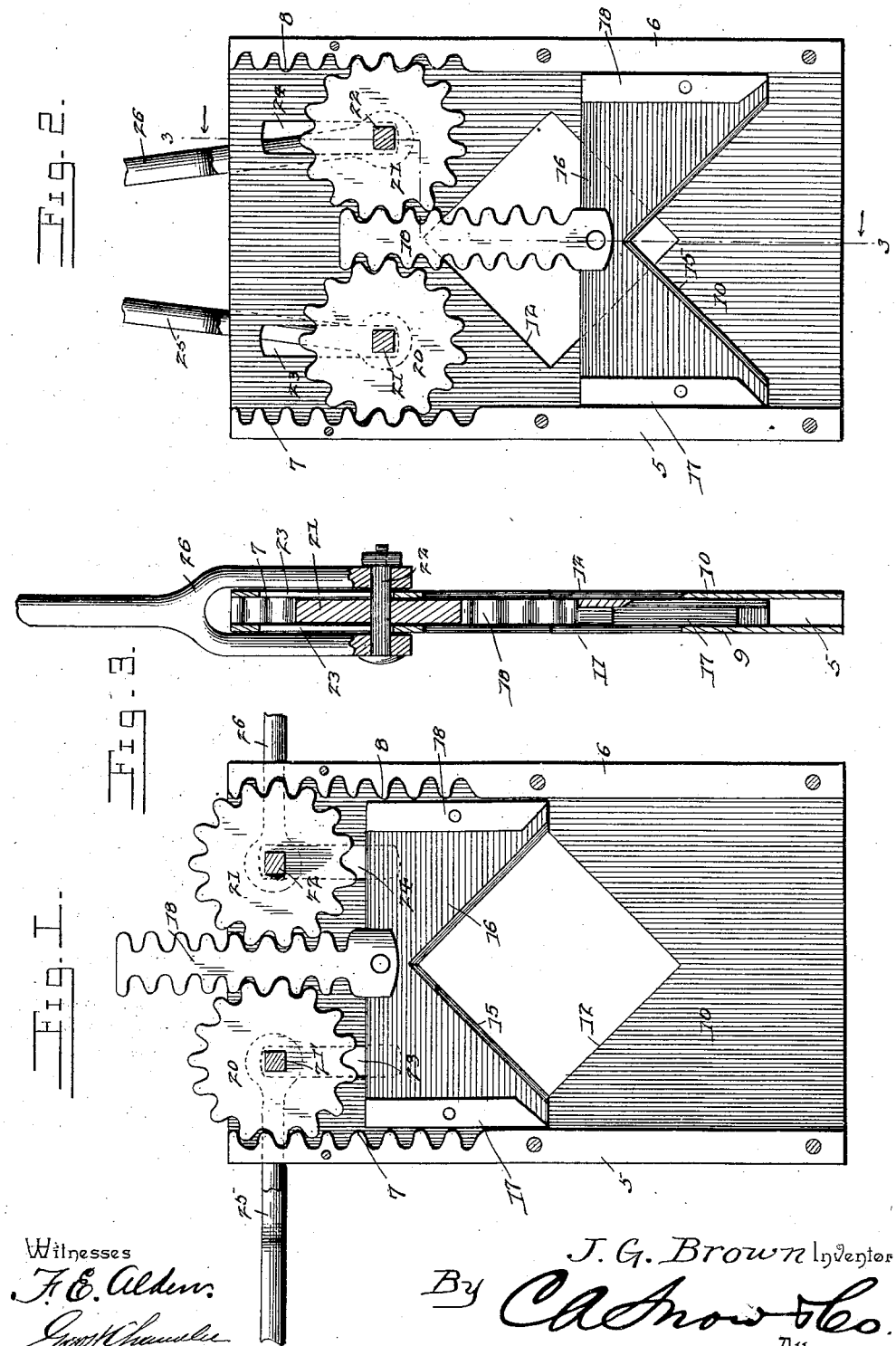
Witnesses
F. E. Alden
Geo. H. Chandler
J. G. Brown Inventor
By C. A. Snow & Co.
Attorneys

UNITED STATES PATENT OFFICE.

JOHN G. BROWN, OF JERSEYVILLE, ILLINOIS.

DEHORNING INSTRUMENT.

SPECIFICATION forming part of Letters Patent No. 700,168, dated May 20, 1902.

Application filed September 24, 1900. Serial No. 30,974. (No model.)

*To all whom it may concern:*

Be it known that I, JOHN G. BROWN, a citizen of the United States, residing at Jerseyville, in the county of Jersey and State of Illinois, have invented a new and useful Dehorning Instrument, of which the following is a specification.

This invention relates to dehorning implements; and it has for its object to provide a simple, cheap, and efficient instrument wherein the structure will be such as to secure rigidity and easy operation of the parts, further advantages of the invention being evident from the following description.

In the drawings forming a portion of this specification, and in which like numerals of reference indicate similar parts in the several views, Figure 1 is an elevation showing one of the side plates of the frame removed to expose the interior mechanism, the cutting-jaws being separated and portions of the operating-levers being broken away. Fig. 2 is a view similar to Fig. 1 and showing the jaws in their closed positions. Fig. 3 is a section on line 3 3 of Fig. 2.

Referring now to the drawings, the present device comprises a frame including parallel bars 5 and 6, at one end of which are formed racks 7 and 8, these bars being disposed parallel and with the racks disposed inwardly, and connecting these bars are the plates 9 and 10, which in connection with the bars form the frame or casing of the implement. In the plates 9 and 10 are formed alining openings 11 and 12, which are square and of the same dimensions and which lie with their diagonals longitudinally of the plates. The lower edges of the opening 12 are beveled on their outer sides to form converging cutting-blades, and coöperating therewith are the beveled edges of an angular opening 15, which is formed in the one side of a slidable knife 16, which is mounted upon bars or slides 17 and 18 and which fit snugly but slidably between the plates 9 and 10 and lie against the inner faces of the lower unbroken faces of the bars 5 and 6. Thus if the device be manipulated to receive a horn through the openings 11 and 12 and the knife be then operated the cutting edges will engage the horn on four sides thereof and will cut it. To thus operate the knife, a stem 18 is provided therefor and extends from its back edge and outwardly of the frame or casing midway between the rack ends of the bars 5 and 6, said stem being in the form of a double rack, as shown.

Engaged with the racks 7 and 8 and with the opposite racks of the stem 18, and which racks lie parallel, are pinions 20 and 21, which when rotated move longitudinally of the racks 7 and 8 and move the stem 18, and therewith the knife, correspondingly. To oscillate the pinions, and thus reciprocate the knife, the pinions are provided with axles 21' and 22, to which they are fixed and which project through alining longitudinal slots 23 and 24 in the plates 9 and 10, which slots aline in pairs. Two levers 25 and 26 are provided, both of which have bifurcated ends, and these levers are disposed to receive the plates 9 and 10 between the members of their bifurcated ends, the members of the lever 25 being rigidly connected with the axle 21', while the members of lever 26 are rigidly connected with the axle 22. Thus if the levers be brought to lie together, as indicated in Fig. 2 of the drawings, the pinions will be rotated to force the stem 18, and therewith the blade, in a direction to effect the cutting operation, while if the levers are moved in an opposite direction the stem, and therewith the blade, will be moved in an opposite direction to receive a horn to be cut.

It will thus be seen that an extremely simple and cheap device is provided and one which, moreover, is efficient in its operation and which possesses great strength and rigidity. It will of course be understood that the specific construction shown may be varied and that any suitable materials and proportions may be used for the various parts without departing from the spirit of the invention.

What is claimed is—

A dehorning instrument comprising two rectangular frame-plates each provided near its center with a rectangular opening having one of its diagonals disposed parallel with the length of the plate, and with two longitudinal slots arranged near one end thereof, and in parallel relation with the sides of the plates, spacing-bars for holding the plates separated at the proper distance apart, the opposed faces of the bars at one end of the plates being formed into racks, and the remainder of the length of each bar being smooth to constitute a guide, a knife having a right-angled recess to coact with the said rectangular openings, and carrying slides to engage the smooth portions of the bars whereby the knife will be guided positively and will be held from any rocking movement, a double-toothed rack-bar carried by the rear portion of the knife and projecting normally beyond the rear ends of the plates, gears meshing with the racks of the spacing-bars and with the double rack-bar, square-shanked studs passing through the said gears and working in the slots in the frame-plate, and bifurcated operating-levers straddling the frame-plates and engaging the said studs, whereby positive pressure will be applied to the said gears equally on both sides thereof, thus to prevent any tendency to lateral strain thereon, which would tend to cause uneven meshing with the racks, substantially as and for the purpose specified.

In testimony that I claim the foregoing as my own I have hereto affixed my signature in the presence of two witnesses.

JOHN G. BROWN.

Witnesses:
E. WHITE,
C. H. MAXWELL.